US005971482A

United States Patent [19]
Goertzen et al.

[11] Patent Number: 5,971,482
[45] Date of Patent: Oct. 26, 1999

[54] CONSTANT CENTER OF GRAVITY TILTABLE CHAIR OF A WHEELCHAIR

[75] Inventors: Gerold G. Goertzen, Brunswick, Ohio; Adrian J. Setacci, North York, Canada

[73] Assignee: Invacare Corporation, Elyria, Ohio

[21] Appl. No.: 08/942,652

[22] Filed: Oct. 2, 1997

[51] Int. Cl.[6] ........ B60N 2/02

[52] U.S. Cl. ........ 297/329; 297/322; 297/330

[58] Field of Search ........ 297/317, 318, 297/329, 322, 330

[56] References Cited

U.S. PATENT DOCUMENTS

| | | | |
|---|---|---|---|
| 2,270,172 | 1/1942 | Ruegger | 297/329 |
| 3,758,151 | 9/1973 | Re . | |
| 3,845,945 | 11/1974 | Lawley et al. | 297/330 X |
| 4,544,200 | 10/1985 | Dunn et al. . | |
| 4,759,561 | 7/1988 | Janssen . | |
| 4,872,903 | 10/1989 | Periou | 297/330 X |
| 4,944,555 | 7/1990 | Brusasco | 297/330 |
| 4,966,379 | 10/1990 | Mulholland . | |
| 5,044,647 | 9/1991 | Patterson . | |
| 5,181,762 | 1/1993 | Beumer | 297/330 X |
| 5,222,402 | 6/1993 | White et al. | 297/330 X |
| 5,297,021 | 3/1994 | Koerlin et al. . | |

FOREIGN PATENT DOCUMENTS

| | | | |
|---|---|---|---|
| 102285 | 10/1937 | Australia | 297/329 |
| 0 841 051 | 5/1998 | European Pat. Off. . | |
| 1363420 | 5/1964 | France | 297/318 |
| 2632504 | 12/1989 | France | 297/329 |
| 0085730 | 5/1983 | Japan | 297/317 |
| 1452940 | 10/1976 | United Kingdom | 297/330 |
| 2103475 | 2/1983 | United Kingdom | 297/317 |
| 2158350 | 11/1985 | United Kingdom | 297/317 |

OTHER PUBLICATIONS

P. 19 of the Summer 1997 Rehab Extra of an advertisement for "The Tiltmaster–C.G." (by Mechanical Application Designs, Inc.).from Pride Health Care Inc. Exeter, Pa., published by Miramar communications, Inc., Malibu, CA.

*Primary Examiner*—Peter M. Cuomo
*Assistant Examiner*—David E Allred
*Attorney, Agent, or Firm*—Hudak & Shunk Co., L P A

[57] ABSTRACT

A wheelchair frame has a guide member operatively and slidably connected thereto. A chair is pivotally attached to the slidable guide member. An actuator for moving the chair forward and backward is connected at one end to the slidable guide member and at the other end to the wheelchair frame. A link arm has one end operatively connected to the frame and the other end pivotally connected to the seat of the integral wheelchair. Upon actuation of the actuator, the guide member moves the chair forward or backwards and as a consequence thereof, the seat is tilted backward or forward by the link arm to substantially maintain the center of gravity of a person seated in the chair.

10 Claims, 4 Drawing Sheets

CONSTANT CENTER OF GRAVITY TILTABLE CHAIR OF A WHEELCHAIR

FIELD OF INVENTION

The present invention relates to a wheelchair wherein the center of gravity of a person seated on an integral chair is substantially maintained when the chair tilts.

BACKGROUND OF THE INVENTION

Heretofore, chairs per se or wheelchairs have existed wherein the chair back, or the chair back and base (seat), were reclinable.

For example, U.S. Pat. No. 3,758,151 to Re relates to a reclining chair adapted to be positioned in close adjacency to a room wall when in the upright sitting position and yet so structured as to allow ready assumption of any of a variety of reclined positions of occupancy without physical contact of any element thereof with the same room wall, the chair concept envisioning a fixed platform, a chassis movable linearly relative to the platform, and a body-supporting unit movable between the sitting and reclining positions relative to the chassis with a concomitant movement of a leg supporting unit between the retracted and extended positions respectively, a propeller link or other means connecting between the body-supporting unit and platform for propelling the body-supporting unit relative to the platform, with the chassis moving forwardly and progressively away from the wall as transition is made from upright sitting position to progressive positions of reclination, wherefore the body supporting unit is concomitantly moved forwardly away from the room wall, and with the chassis moving rearwardly and progressively toward the wall as transition is made from positions of reclination to upright sitting position, wherefore the body-supporting unit is concomitantly moved rearwardly and toward the room wall.

U.S. Pat. No. 4,759,561 to Janssen relates to a wheelchair comprising an underframe with front and rear wheels, and a seat part (1) which is adjustable relative to the underframe, which seat part (1) can be tilted forward and backward relative to the underframe in such a way that the overall center of gravity (6) of seat part (1) and wheelchair user (5) essentially assumes a fixed position relative to the underframe.

U.S. Pat. No. 4,966,379 to Mulholland relates to a wheelchair having opposing sideframes each of which comprise a base section which is pivotally connected by a brace member to an inclinable seat section. An extender mechanism interconnects the seat section to a brace member and provides releasable securement for a wheelchair seat at selected angular positions. Backrest bars are independently adjustable with a similar extender mechanism that interconnects the bars with a respective seat section. The sideframes are spaced apart with hinged spacer bars, which includes a latching device for releasably securing the bars in an open position. The bar and frame sections have elongated slots containing fasteners for adjustable connections with fasteners from adjunct wheelchair assemblies.

U.S. Pat. No. 5,044,647 to Patterson relates to a kit or assembly which can be used in the manufacture of a new wheelchair or to retrofit an existing wheelchair. The basic wheelchair structure includes a base portion having a pair of cross members mounted in the rear half of the upper portion of the wheelchair base structure. A pair of parallel guide rails is mounted between the cross members with a seat support bar attached to a pair of pillow blocks mounted on the guide rails. A linear actuator is centrally positioned within the wheelchair base structure to longitudinally move the seat support bar forwardly or rearwardly within the wheelbase of the wheelchair. A rear edge of a wheelchair seat unit is pivotally attached to the upper surface of the seat support bar. Cam plates, each having a curved cam slot, are provided on each side of the seat unit with the cam slots engaging cam followers mounted on a pair of stanchions provided on each side of the rear portion of the base structure. A control switch causes the linear actuator to move the seat support bar in a forward or rearward direction, which causes the seat unit to move causing the cam follower pins positioned within the cam slots to tilt or angularly move the seat unit to a maximum reclined position of approximately 60 degrees. The entire seat unit is moved forward a predetermined distance to obtain the desired degree of tilt and to maintain the center of gravity substantially centered within the base structure to maintain the balance and stability of the wheelchair and the safety of the patient.

U.S. Pat. No. 5,297,021 to Koerlin et al. relates to a wheelchair seat having a backrest assembly with a counter balance to provide equilibrium. A control loop is included on the sliding backrest to sense the onset of shear and compensate the backrest to a zero shear position during recline. A leg rest assembly has a selectable lift arrangement for either independent or recline lift.

SUMMARY OF INVENTION

The present invention relates to a tiltable wheelchair. The chair contains a pivot point at generally the junction of the chair seat and back and is connected to a longitudinal guide member, which slides along a substantially horizontal and linear guide rail. An actuator, which causes the chair to move either forward or backward, is operatively connected to the wheelchair frame and to the slidable guide member. As the chair moves forward, a link arm, which is operatively connected to the frame at one end and to a chair seat pivot point at the other end, causes the chair to rotate or tilt backward. Desirably, the link arm is approximately the same length as the distance from the seat pivot point to the chair pivot point. The rearward tilt of the center of gravity of a person seated in the chair is such that it is substantially equal to the forward movement of the chair so that said center of gravity is substantially maintained.

BRIEF DESCRIPTION OF THE DRAWINGS

FIG. 3 is a top plan view showing the wheelchair frame assembly, actuator, and the like;

DETAILED DESCRIPTION OF THE PREFERRED EMBODIMENT

According to the present invention, a standard or conventional wheelchair contains a stable but tiltable chair which can be manually operated or powered by a source of energy such as a battery. The wheelchair furthermore can contain a rear wheel axle directly mounted to a frame or utilize a suspension mount.

Figure 1:
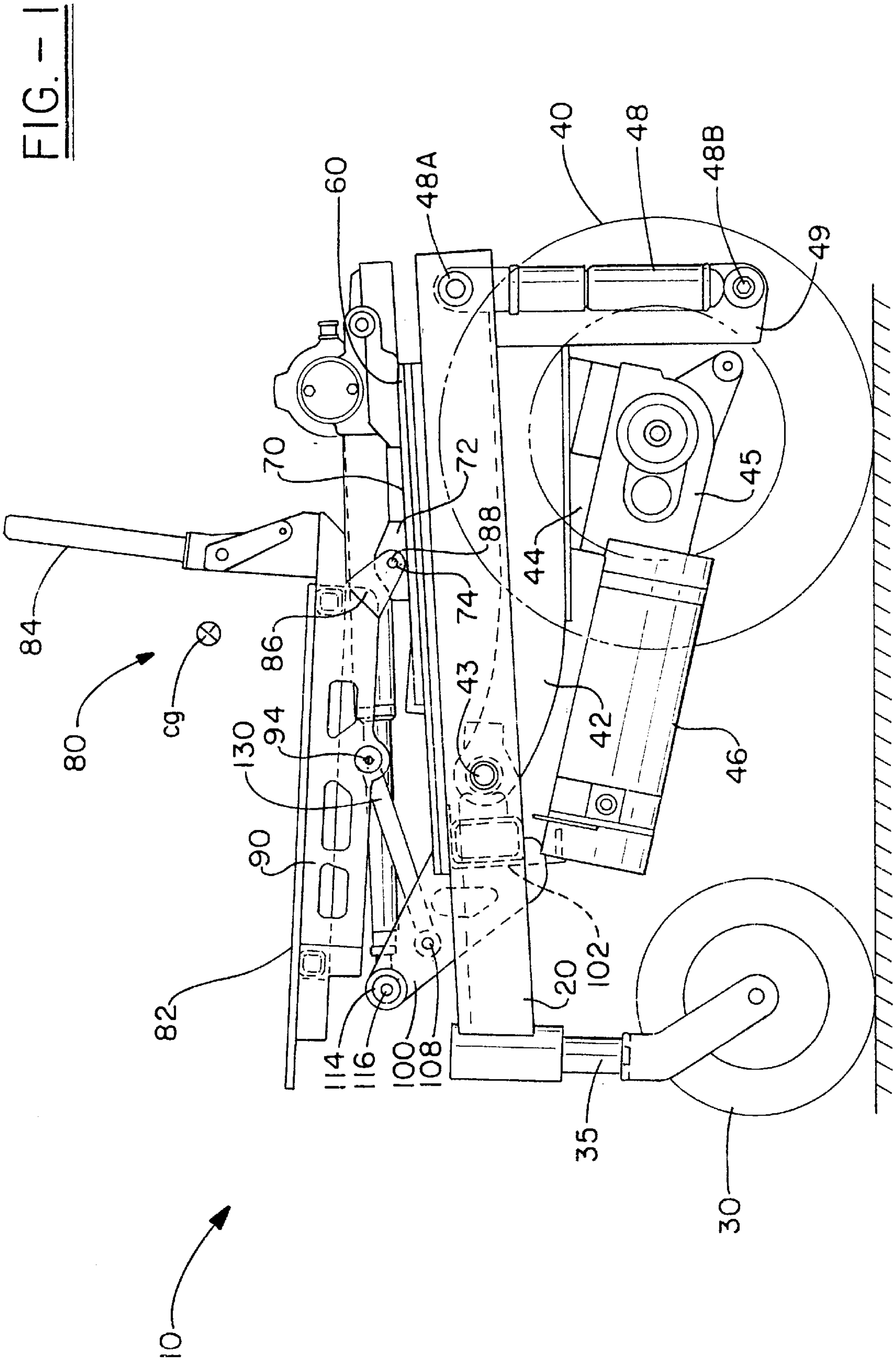
FIG. 1 is a side elevational view of a wheel chair of the present invention showing the chair in an upright position.
Figure 2:
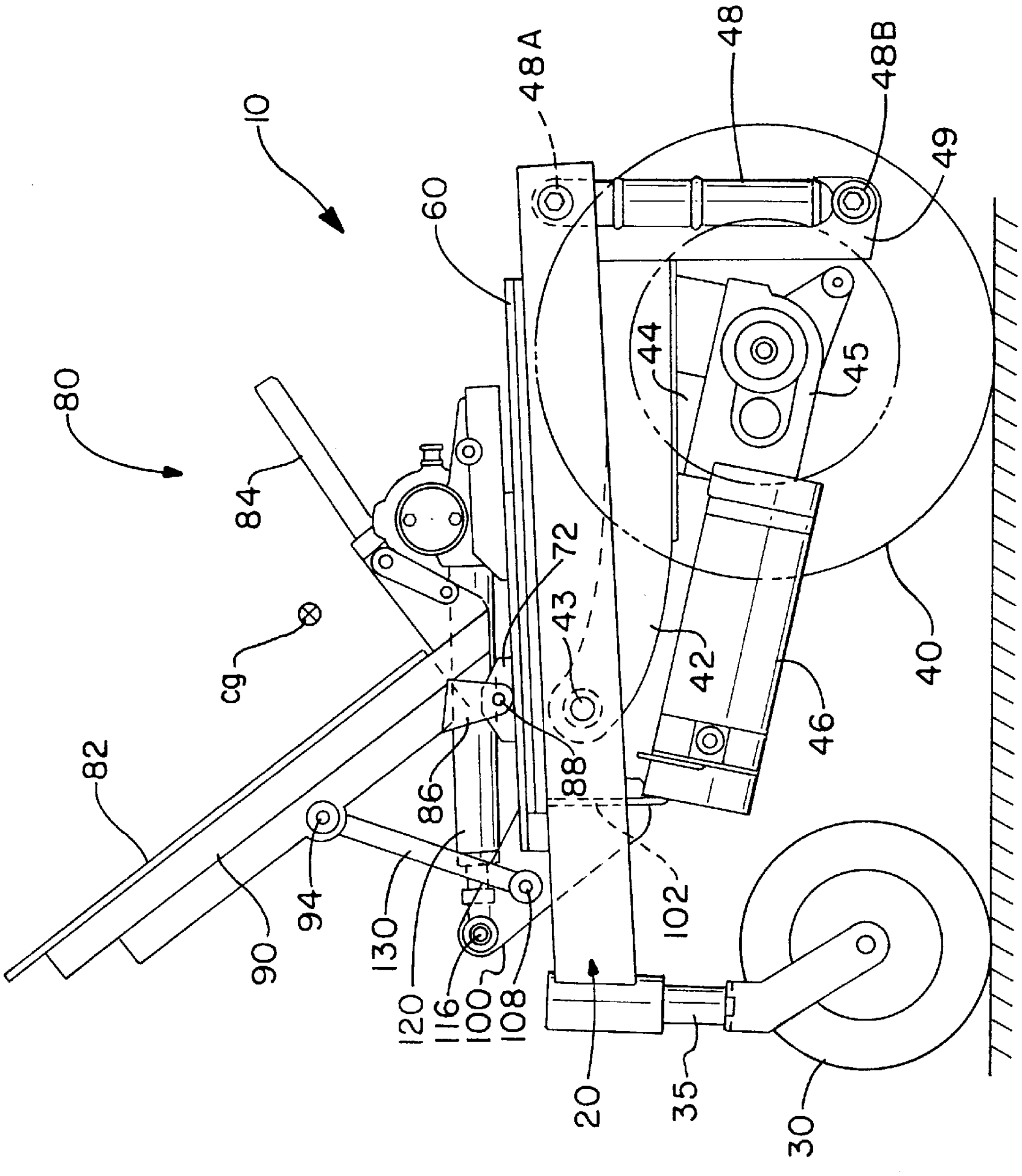
FIG. 2 is a side elevational view showing the chair tilted substantially backwards.

Referring to the drawings and particularly to FIGS. 1 and 2, the wheelchair, generally indicated by the number 10, comprises frame 20 and front and rear wheels. Front wheel 30, which can be solid or pneumatic, is mounted to the front portion of frame 20 by caster assembly 35. This arrangement allows the front wheel to freely rotate during use of the wheelchair so that it has a short turning radius. Rear wheel 40 is attached to the frame via swing arm 42. The front end of the swing arm is pivotably attached as through pin 43 to the frame. The back end of the swing arm can be attached to wedge 44 which in turn is connected to gearbox 45. Gearbox 45 is connected to rear wheel 40 and is operated by motor 46. To dampen bumps or uneven surfaces encountered by rear wheel 40, shock absorber 48, which may or may not contain a compression spring, is connected at one end 48A to frame 20 and at the other end 48B to swing arm suspension bracket 49.

Rail 60 desirably resides on the top surface of frame 20 and extends a substantial length of the frame such as at least 40 or 50 percent thereof. Rail 60 is linear and inasmuch as it is attached to the frame, extends in generally a horizontal direction. The rail can generally have any cross-sectional shape such as an "X" having grooves or indentations along each side thereof. Longitudinal guide member 70 slidably engages rail 60 and can extend along a significant length thereof, for example, at least 30 percent, and desirably at least 40, 50 or 60 percent. The slidable engagement between guide member 70 and rail 60 can be accomplished by a number of means such as lubrication, low friction guide surfaces, etc., with ball bearings being preferred. Desirably, a vertically extending bracket 72 having an aperture 74 therein is attached at approximately the center portion of guide member 70.

Chair 80 contains an integral seat 82 and back 84. Chair pivot bracket 86 is connected to the chair generally in the vicinity of the junction of the back and seat portions such as directly below the back. Chair pivot bracket 86 contains aperture 87 therein. Although chair 80 can be movably or slidably attached directly to frame 20 or rail 60 as through slots, not shown, it is desirably attached to guide member 70. For example, through pivot pin 88, chair 80 is pivotally attached to longitudinal guide member bracket 72 so that the chair can tilt backwards any desired degree.

Figure 4:
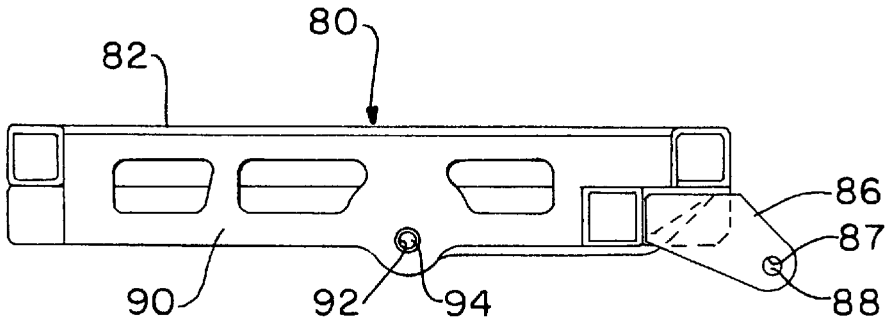
FIG. 4 is a side elevational view showing chair seat frame.

Chair seat 82 is connected to chair seat frame 90. As best shown in FIG. 4, generally the center portion of the seat frame longitudinal length has a pivot aperture 92 to receive a pin 94 therein. Pivot pin 94 serves to rotatably or pivotally engage chair seat frame 90 and link arm 130.

Figure 3:
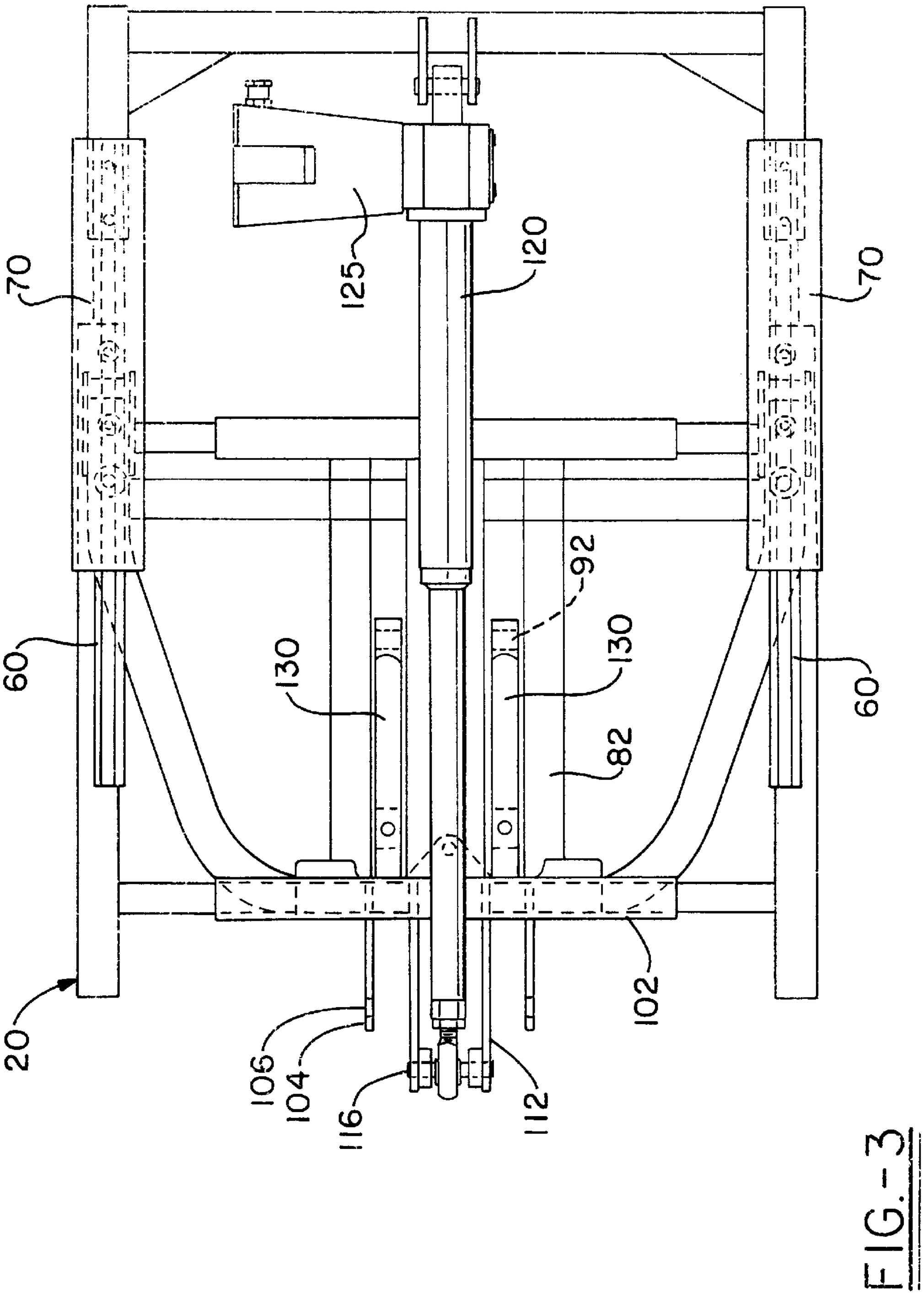

Referring to FIGS. 1, 2, and 3, cross frame bracket 100 is attached to cross frame 102. The cross frame bracket extends forward from the cross frame and has a plurality of linking members and lateral arms extending therefrom. More specifically, lateral bracket-linking members 104 each have an aperture 106 therein to receive pin 108. Pin 108 serves to pivotally attach link arm 130 to bracket 100. Cross frame bracket 100 also contains a pair of lateral arms 112 which extend forward from the cross frame with each arm having an aperture 114 therein for receiving pin 116. Pin 116 serves to connect actuator 120 with cross frame bracket 100.

Actuator 120 as noted, at its forward end, is connected to the cross frame bracket 100 via lateral arms 112 and pin 116. The other or backward end of actuator 120 can be directly attached to chair 80 such as through chair pivot bracket 86 (not shown). However, chair 80 is desirably attached to longitudinal guide member 70 in any conventional manner and desirably at a different location than the chair attachment to the guide member. As noted above, guide member bracket 72 is fixedly secured to slidable longitudinal guide member 70. Thus, as actuator 120 is retracted, it moves guide member 70 forward, which because it is fixedly secured to guide member bracket 72, moves chair 80 forward through chair bracket 86.

Actuator 120 can be any mechanical device, which reciprocates backwards and forward and desirably is driven by electric motor 125. While a hydraulic system may be utilized, an actuator is desired with a ball screw linear actuator being preferred.

As shown in the drawings such as FIGS. 2 and 3, link arm 130 is connected at one end to cross frame bracket lateral members 104 and at the other end to any portion of integral chair 80 and preferably to the center portion of chair seat frame 90. It is a desirable aspect of the present invention that the link arm length, i.e., the distance from seat frame pivot pin 94 to cross frame bracket link pin 108 is substantially equal to the distance from seat pivot pin 94 to chair pivot pin 88. That is, these two distances or lengths generally contain less than a 30 percent difference, desirably less than a 20 percent difference, and preferably less than a 15 percent, 10 percent, and even a 5 percent difference based upon the length of the longer distance. Moreover, as shown, link arm 130 from pivot point 94 is inclined downwardly from about 15 to about 35 degrees whereas a line from pivot point 94 to chair pivot pin 88 is almost horizontal or slightly inclined downwardly as from about 2 to about 8 degrees. These aspects generally provide for maintaining the center of gravity, i.e., "cg," of a person seated within the tiltable chair as more fully described herein below.

The operation of the tiltable chair of the present invention is as follows. Upon actuation of a switch as by a person confined to a wheelchair, motor 125 is activated and actuator 120, e.g., a ball screw linear actuator, is retracted. Because the linear actuator is fixedly attached to cross frame bracket 100, the rear portion (e.g., casing) of the linear actuator is drawn forward. Since the actuator casing is fixedly attached to longitudinal guide member 70, it causes the guide member to slidable move forward over rail 60. Inasmuch as chair pivot bracket 86 is also fixedly attached to longitudinal guide member 70, the chair is also moved forward. As a consequence thereof, link arm 130 pivots about pin 108 and causes seat 82 to be raised in a rearward tiltable manner as shown in FIG. 2. The tilting of the chair causes the center of gravity (cg) of an individual seated on the chair to be moved tiltingly backwards. Since the length of link arm 130 is approximately equal to the distance between seat frame pivot pin 94 and chair pivot pin 88, the distance chair pivot pin 88 is moved forward is substantially equal to the distance chair back 84 tilts backwards at a particular height of the back which generally coincides with the center of gravity of a person seated on the chair. The center of gravity of a person is typically located on a vertical line slightly, e.g., about ½ to about 3 inches, behind their navel. The net result is that while the "cg" of the seated person is moved backwards by the tilting of the wheelchair, the forward movement of the chair as a whole results in substantially maintaining the center of gravity, i.e., the physical longitudinal movement, of the person at the same position or location on the wheelchair. That is, the forward or backward longitudinal movement of the "cg" is less than 20 percent, desirably less than 15 or 12.5 percent, and preferably less than 10 percent, 7.5 percent, 5 percent or 2.5 percent of the total longitudinal distance of wheelchair frame 20. This provision of maintaining the center of gravity (longitudinally) maintains stability of the wheelchair and yet permits a person seated thereon to be tilted backwards. The tilt or rotation of the wheelchair can be to any desired degree. For example, if the initial wheelchair seat is horizontal, it can be tilted rearwardly over a range of approximately 45 degrees and thus to an angle of about 45 degrees from the horizontal. Should the wheelchair seat, however, be at an initial slight inclination to the horizontal, for example, 5 degrees, the tilt thereof through a 45 degree angle will move the seat backward to an angle of from 50 degrees from the horizontal. Generally any desired degree of tilt or rotation can be built in to the wheelchair assembly of the present invention.

Upon reversal of the linear actuator, the seat can be returned to its generally substantial horizontal position.

Figure 5A:
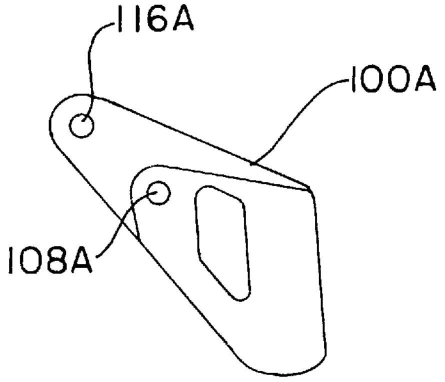
FIGS. 5A and 5B are side elevational views showing a cross frame bracket generally proportionally identical to but smaller than the brackets shown in FIGS. 1, and 2.
Figure 5B:
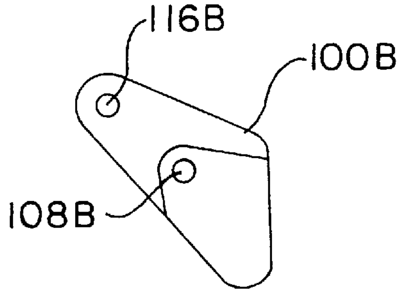

To maintain the stability of the tiltable chair of the wheelchair of the present invention when the same is utilized by a large person or a small person, different size brackets are utilized such as shown in FIGS. 5A and 5B. These brackets are generally identical to the brackets shown in FIGS. 1 and 2, except that bracket 5A is larger, and bracket 5B is smaller than bracket 100. In other words, the forward projection or distance of bracket pivot link 108A is longer than that in FIGS. 1 and 2. The forward projection of distance of bracket link pivot pin 108B to cross frame 102 as shown in FIG. 5B is shorter than in FIGS. 1 and 2. The net result is when an appropriate longer bracket 5A is utilized for a small person, chair 80 is moved to a more forward location than that shown in FIGS. 1, and 2. Conversely, when a shorter bracket 5B is utilized for a large person, chair 80 is moved to a more rearward or backward location than that shown in FIGS. 1 and 2. In either event, the center of gravity of a large person (more forward than a normal person) or a short person (more rearward than a normal person) when using an appropriately sized bracket will generally be at about the same location as that of a normal sized person as in the embodiment of FIGS. 1 and 2. Thus, the stability of the tiltable chair is maintained.

While in accordance with the patent statutes the best mode and preferred embodiment have been set forth, the scope of the invention is not limited thereto, but rather by the scope of the attached claims.

What is claimed is:

1. A wheelchair, comprising;

a wheelchair frame, a tiltable chair operatively and movably connected to said frame, said tiltable chair having an integral seat and back and being tiltable about a chair pivot point:

a guide member operatively and slidably engaging said frame, said chair tiltably mounted on said guide member;

an actuator having one end operatively connected to said frame and having the other end operatively and supportedly attached to said slidable guide member; and a link arm having one end operatively and pivotably connected to said frame and the other end pivotally connected to said chair, said actuator capable of moving said guide member forward so that in consequential response to said chair movement said link arm pivots and causes said chair to be tilted backwards about said chair pivot point.

2. A wheelchair according to claim 1, wherein the center of gravity of a patient in said chair is substantially maintained as said actuator moves said chair forward and said link arm tilts said chair backwards.

3. A wheelchair according to claim 2, wherein said link arm has a frame pivot point and the distance of said link arm frame pivot point to said link arm chair pivot point is substantially equal to the distance from said link arm chair pivot point to said tiltable chair pivot point.

4. A wheelchair according to claim 3, wherein said link arm is connected to a seat frame of said chair.

5. A wheelchair according to claim 4, wherein said actuator is movable in a substantially horizontal forward and rearward direction with respect to said wheelchair frame.

6. A wheelchair having a tiltable chair, comprising;

a wheelchair frame;

a guide member operatively and slidably engaging said frame;

the chair having an integral back and seat, said chair pivotally attached to said slidable guide member;

an actuator capable of moving said chair, one end of said actuator operatively attached to said wheelchair frame and the other end operatively and supportedly attached to said guide member; and a link arm, one end of said link arm operatively and pivotally attached to said wheelchair frame and the other end of said link arm pivotally attached to said chair, the length between said link arm pivot points being substantially equal to the length of the distance from said link arm chair pivot point to said chair guide member pivot point so that as said actuator moves said integral chair forward, said link arm will rotate and cause said chair to tilt backwards.

7. A wheelchair having a tiltable chair according to claim 6, wherein said chair guide member pivot point is located substantially under said chair back, including a rail located on said frame, said guide member slidably engaging said rail, and wherein said actuator is movable in a forward and a backward direction.

8. A wheelchair having a tiltable chair according to claim 7, wherein the center of gravity of a person seated in said tiltable chair is substantially maintained with respect to said wheelchair frame as said actuator moves said chair forward and said link arm tilts said chair backwards.

9. A wheelchair having a tiltable chair according to claim 6, wherein the difference of lengths of said link arm pivot points and the length of said chair pivot point—guide member pivot point is less than 15 percent based upon the longer of said lengths, and wherein the center of gravity of a person seated in said tiltable chair is substantially maintained with respect to said wheelchair frame as said actuator moves said chair forward and said link arm tilts said chair backwards.

10. A wheelchair having a tiltable chair according to claim 6, wherein the center of gravity of a person seated in said tiltable chair is substantially maintained with respect to said wheelchair frame as said actuator moves said chair forward and said link arm tilts said chair backwards.

* * * * *